June 25, 1968  J. D. NEWMAN ET AL  3,390,340
DIGITAL COUNTER EMPLOYING LOGIC GATING NETWORK
INDEPENDENT OF COUNTER STAGE(S) CONTROL
TO EFFECT RESET OPERATION
Filed Aug. 28, 1963  8 Sheets-Sheet 4

FIG.4.
PRIOR ART

|   | A | B | C | D |
|---|---|---|---|---|
| 1 | 0 | 0 | 0 | 1 |
| 2 | 1 | 0 | 1 | 1 |
| 3 | 1 | 1 | 1 | 0 |
| 4 | 1 | 1 | 0 | 0 |
| 5 | 1 | 0 | 0 | 0 |

|   | A | B | C | D |
|---|---|---|---|---|
| 6 | 1 | 0 | 0 | 1 |
| 7 | 0 | 0 | 1 | 1 |
| 8 | 0 | 1 | 1 | 0 |
| 9 | 0 | 1 | 0 | 0 |
| 0 | 0 | 0 | 0 | 0 |

FIG.5.

J. D. NEWMAN &
R. A. ELLIOT
INVENTORS
BY William E. P. Bayly
ATTORNEY

FIG. 6.

| DIVISION RATIO | NUMBER | RESET | | | | RESET CONTROL INPUTS | | | |
|---|---|---|---|---|---|---|---|---|---|
| | | A | B | C | D | W | X | Y | Z |
| 10 | 1 | 0 | 0 | 0 | 1 | 0 | 0 | 0 | 1 |
| 1 | 0 | 0 | 0 | 0 | 0 | 0 | 0 | 0 | 0 |
| 2 | 9 | 0 | 1 | 0 | 0 | 0 | 1 | 0 | 0 |
| 3 | 8 | 0 | 1 | 1 | 0 | 0 | 1 | 1 | 0 |
| 4 | 7 | 0 | 0 | 1 | 1 | 0 | 0 | 1 | 1 |
| 5 | 6 | 1 | 0 | 0 | 1 | 1 | 0 | 0 | 1 |
| 6 | 5 | 1 | 0 | 0 | 0 | 1 | 0 | 0 | 0 |
| 7 | 4 | 1 | 1 | 0 | 0 | 1 | 1 | 0 | 0 |
| 8 | 3 | 1 | 1 | 1 | 0 | 1 | 1 | 1 | 0 |
| 9 | 2 | 1 | 0 | 1 | 1 | 1 | 0 | 1 | 1 |

FIG. 7.     0 CLOSES GATE 78
            1 OPENS GATE 78

J.D. NEWMAN & R.A. ELLIOT
INVENTORS

BY William E.P. Bayly
ATTORNEY

June 25, 1968    J. D. NEWMAN ET AL    3,390,340
DIGITAL COUNTER EMPLOYING LOGIC GATING NETWORK
INDEPENDENT OF COUNTER STAGE(S) CONTROL
TO EFFECT RESET OPERATION
Filed Aug. 28, 1963    8 Sheets-Sheet 8

J.D. NEWMAN &
R.A. ELLIOT
INVENTORS
BY William E.P. Bayly
ATTORNEY

United States Patent Office 3,390,340
Patented June 25, 1968

3,390,340
DIGITAL COUNTER EMPLOYING LOGIC GATING NETWORK INDEPENDENT OF COUNTER STAGE(S) CONTROL TO EFFECT RESET OPERATION
John D. Newman, Hayling Island, and Robert A. Elliot, Petersfield, England, assignors to Plessey-U.K. Limited, a British company
Filed Aug. 28, 1963, Ser. No. 305,232
Claims priority, application Great Britain, Aug. 31, 1962, 33,600/62
7 Claims. (Cl. 328—48)

This invention relates to digital counters.

In certain applications of digital counters it is desirable for the counter to sum a train of events up to a predetermined number and then both to deliver a significant output and to commence a new counting cycle with the next input event. This can demand very high operating speeds, not only in the counter stages themselves but also in the ancilliary circuits for recognising the desired total and for resetting the counter. An application of particular importance occurs in frequency generators in which a high-speed digital counter is used as a frequency divider of arbitrary scale, producing any desired submultiple of an input frequency.

The maximum frequency of operation of a counter used as a frequency divider in this way is limited partly by component operating speeds and partly by the time taken to recognise the fact that the counter has reached a predetermined total and subsequently to reset the counter to a second predetermined figure, which may or may not be zero. In a counter employing serially-arranged counter stages, with "carry" pulses transmitted between stages, recognition speeds are limited by cumulative delays between stages and the resetting operation may be complicated by the generation of unwanted carry pulses.

According to the invention, a digital counter includes at least two multi-stable devices having inputs arranged to receive input pulses from a common input line through gating devices which determine the effect of an input pulse on the respective bistable devices and which are arranged to be set each in correspondence with the state of at least one of the bistable devices in such a way that a succession of input pulses causes the counter to progress through a repeated series of counting states, the counter including also means for recognising when the counter has arrived at a selected one of its possible states and for responding to this recognition in such a way that the next consecutive input pulse is employed as a resetting pulse for resetting the counter to recommence counting from a selected one of its possible states.

In such an arrangement no question of cumulative stage delays arises, the time taken to recognize any number being determined by the time required to set an individual counting stage. The resetting of the counter between two consecutive input pulses is no longer necessary, avoiding the use of ancillary circuits such as reset pulse generators having high operation speeds.

A further aspect of the invention consists in an electrical oscillation generator including a variable-frequency oscillator, a variable-ratio divider consisting of a digital counter according to the present invention, as hereinbefore defined, arranged to count the cycles of the output waveform of the variable-frequency oscillator and to deliver an output pulse each time a predetermined number of cycles is counted, and means for controlling the frequency of the oscillator so as to reduce to zero the deviations of the repetition frequency of the divider output pulse train from a fixed master frequency.

The foregoing and other features of the invention will be evident in the following description of various preferred embodiments thereof.

The description refers to the accompanying drawings, in which.

The circuit elements shown in block form in the drawings are all examples of devices in widespread current use, so that detailed description of their circuit arrangements is unnecessary.

The apparatus shown in the drawings forms an oscillation generator capable of covering a wide frequency range, in fixed frequency steps, with accuracy determined by a single frequency source, such as a crystal-controlled oscillator, that constitutes its internal standard of frequency. Any frequency within its range can be set up directly by means, for example, of a series of decade switches calibrated directly in frequency.

Figure 1:
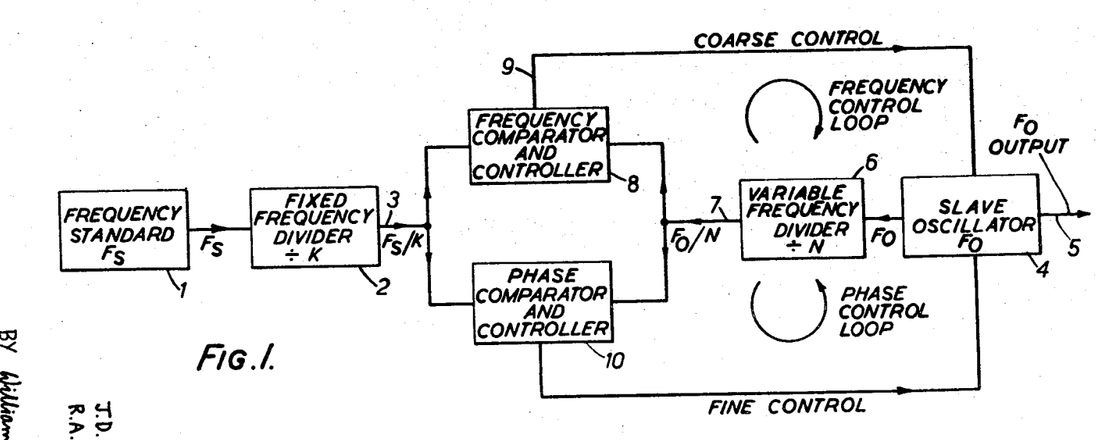
FIGURE 1 is a general block diagram of a variable-frequency oscillation generator.

Referring now first to FIGURE 1, the oscillator generator comprises a crystal-controlled master oscillator 1 serving as a frequency standard and operating at a frequency $F_S$, and a digital frequency divider 2 operating at a fixed division factor K to produce on its output line 3, a train of pulses at a repetition frequency $F_S/K$. The useful outputs of the generator is obtained from a slave oscillator 4 tunable over the required frequency range. In order to control the frequency of the slave oscillator 4 to a selected integer multiple of the base frequency $F_S/K$, the output of the slave oscillator 4, in addition to being supplied to an output line 5, is also supplied to a second frequency divider 6, which likewise operates on the digital principle, but the division factor N of which, in contrast to that of divider 2, is adjustable to any one of the digital numbers corresponding to the multiples of the base frequency at which slave oscillator 5 is required to be operable. Both dividers 2 and 6 are arranged to supply a pulse output, and both the output of fixed-ratio divider 2, via its output line 3, and the output of variable-ratio frequency divider 6, via a line 7, are supplied as inputs to a frequency comparator and controller 8 which, via a control loop 9, varies the tuning of the slave oscillator 4 to increase or decrease its oscillation frequency when the number of pulses received from line 3 exceeds the number of pulses received from line 7 or vice versa. When the frequency of pulses produced by the slave oscillator is close to the desired frequency, comparatively long periods will arise in which no excess pulse is received from either lines 3 or line 7, and accordingly a phase-responsive fine control is arranged to be provided in these circumstances by means of a phase comparator 10 which produces an output proportional to the phase difference between the pulses received respectively from lines 3 and 7, the phase-comparator output being utilised for a fine control of the slave-oscillator frequency, firmly locking that frequency to the selected multiple of the base frequency produced from the frequency standard.

Figure 2:
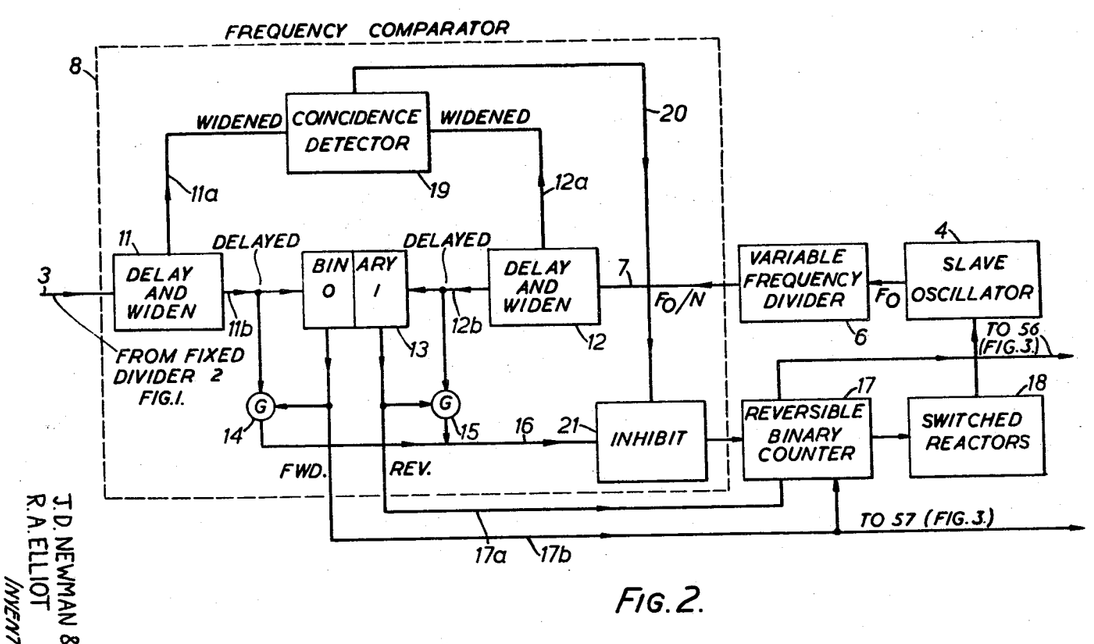
FIGURE 2 is a more detailed block diagram of the coarse frequency-control circuits of the generator.

One form of the frequency comparator and controller 8 of FIGURE 1 is shown in more detail in FIGURE 2. The two respective outputs of the fixed-ratio frequency divider 2 and the variable-ratio frequency divider 6 are fed by their associated output lines 3 and 7 to two identical delay networks 11 and 12 which each have two outputs 11a, 11b and 12a, 12b respectively. The output bearing the index a differs from the input by the fact that each pulse is widened, so that each pulse extends over a greater portion of the pulse cycle than the input pulse, while the pulses supplied through the line bearing the index b are delayed in time compared with the input pulses. The delayed output pulses on lines 11b and 12b are fed to a binary or bistable device 13 which is so arranged that a pulse from line 11b will put the device 13 into one of its stable states, thereby opening a first gate 14 and closing a second gate 15 while an input via line 12b will put the bistable device 13 to its other stable position, in which it closes gate 14 and opens gate 15. Assuming that the base frequency $F_s/K$ is equal to the frequency $F_o/N$ of the pulses in line 12b ($F_o$ being the frequency of the slave oscillator selected by adjusting the variable-ratio frequency divider 6 to the ratio N) pulses will arrive alternately on lines 11b and 12b, each pulse finding the gate 14 or 15 in its own path closed and causing it to be opened and the other one closed by changing over the binary 13. As a result neither gate 14 nor gate 15 will pass any pulses. If on the other hand the frequency of the slave oscillator is, for example, somewhat lower than the selected frequency $F_o$, the spacing of the pulses from line 12b is longer than that of the pulses from line 11b, so that, at least occasionally, a pulse from line 12b will be followed by two successive pulses from line 11b before the next pulse arrives from line 12b. When this occurs, the first of these two successive pulses will change over the binary 13 to open gate 14 and close gate 15, as before; but the second of the two pulses will find gate 14 already open and will therefore pass through gate 14 and by a common line 16 to a binary counter 17, each step of which varies by one unit the reactance of a switched reactor set 18 forming part of the tuning circuit of the slave oscillator.

The binary counter 17 is of the reversible type; the binary device 13 is arranged when set to state 0 by a pulse from the master oscillator via line 11b to energise a "forward" control line 17b of the counter 17, and conversely when set to state 1 by a pulse from the slave oscillator via line 12b to energise a "reverse" control line 17a. The counter is thus conditioned for forward or reverse counting when subsequently receiving any gated pulse via line 16, making the appropriate positive or negative correction to the tuning of the oscillator 4.

Sprious pulses may appear in line 16 when a pulse from one input appears so shortly after a pulse from the other input that the gates 14 and 15 have not yet had time to adopt their appropriate states. To prevent such spurious pulses from reaching the counter a coincidence detector 19 is provided, having two inputs from the widened pulse-output lines 11a and 12a. If two pulses from delay circuits 11 and 12 follow each other in very close succession, the widened pulses will overlap. The detector 19 recognises this overlap and produces an output in a line 20 leading to an inhibit gate 21 at the input of the binary counter 17; since the pulses applied to line 16 are delayed, the inhibit gate 21 will be reliably closed when there is any chance of sprious counting pulses arriving in line 16.

It will be understood that the counter 17 may be utilised in various ways to control the frequency of the slave oscillator 4. In particular it is possible to arrange an electromechanical coarse tuning system in which a motor-driven variable capacitor, with or without associated range selection switches, is controlled by a servo-mechanism arranged to set the capacitor shaft to the angular position represented by the state of the counter 17, a binary-coded disc of known type being used as a positional pick-off. This arrangement would be advantageous if the oscillation generator was incorporated, for example, in a radio transmitter having tuned amplifier stages: the provision of a mechanical output corresponding to the coarse tuning of the primary oscillation generator would enable all the tuned circuits of the transmitter to be set for operation at a required frequency by a single operation.

Figure 3:
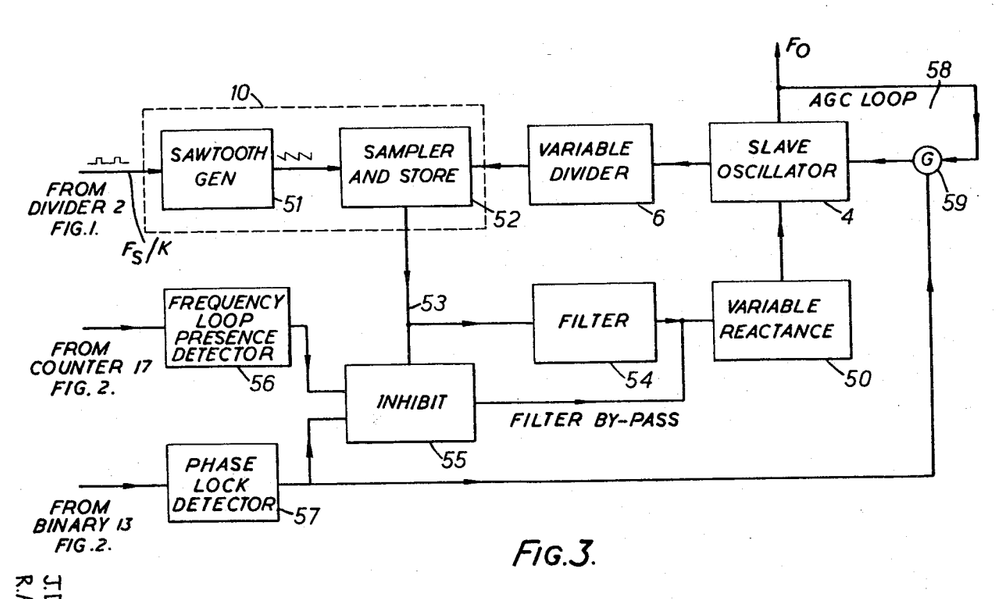
FIGURE 3 is a block diagram of the fine frequency control circuits of the generator.

FIGURE 3 of the drawings shows the phase control arrangements for the fine frequency control of the slave oscillator 4. The main phase-control loop consists of the phase comparator 10, in which the relative phase of the pulse trains derived from the slave oscillator 4 through the variable divider 6, and from the frequency standard source 1 (FIGURE 1) and the fixed divider 2, is determined, the output from the phase comparator 10 acting to control the frequency of oscillation of the slave oscillator 4 through a variable reactance device 50.

The phase comparator 10 includes a saw-tooth generator 51 triggered by the incoming pulse train from the frequency standard source 1, producing a rising or falling saw-tooth waveform whose repetition frequency is equal to $Fa/K$.

A sampling and storage circuit 52 samples the saw-tooth output of the generator 51 at instants determined by the arrival of each pulse from the variable divider 6. The sampled saw-tooth level is held in the store 52 between sampling instants. If the two pulse trains have exactly the same repetition frequency, their phase relationship remains constant, so that the saw-tooth output of generator 51 is sampled at the same time in each cycle and the output 53 of the comparator 10 is a uni-directional voltage of constant level. If the two pulse trains differ slightly in frequency, the comparator output 53 will be a saw-tooth waveform of "staircase" profile, whose repetition frequency is proportional to the difference between the frequencies of the two pulse trains. This signal is applied to the variable reactance device 50, which acts upon the slave oscillator 4 so as to vary its output frequency in the correct sense for reducing the phase error detected by the comparator 10, thus closing the phase loop.

If the storage device 52 is of a simple nature, such as a capacitor charged to the storage level at each sampling instant, there is the risk that a change in the stored level during the sampling intervals will result in the output 53 of the store having components of the frequency of the pulse trains applied to the comparator 10. These components could reset on the slave oscillator 4 through the variable reactance control 50 to produce frequency modulation of the slave oscillator output. To prevent this a low-pass filter 54 is included in the phase control loop between the store 52 and the reactance device 50. The filter 54 has only to ensure that components of the name order as the pulse repetition frequencies are adequately attenuated before the output signal 53 of the store 52 is applied to the variable reactance device 50, and may be a simple CR filter or passive integrator. Its presence in the phase control loop will effectively inhibit the loop from responding to the relatively large difference frequencies between the two pulse trains that are properly to be dealt with by the frequency control loop shown in FIGURE 2. However the presence of the filter means that the response of the phase control loop to relatively large phase differences between the two pulse trains, such as may exist immediately after locking of one frequency control loop, will also be restricted. An inhibit gate 55 is therefore provided which by-passes the filter 54 during the period immediately following frequency locking in which the phase control loop is searching for phase lock. The gate 55 is opened, by-passing the filter 54, when the frequency loop presence detector 56, energised from the reversible binary counter 17 in FIGURE 2, shows that frequency locking has been achieved as shown by the counter remaining in the same state for an appreciable period; and is closed again when the phase lock detector 57, energised from the binary gate 13 in FIGURE 2, shows that phase lock has been achieved, as shown by the mark/space ratio of the signal in line 17a or 17b remaining constant.

The slave oscillator 4 is provided with an automatic gain control loop, indicated diagrammatically at 58, for stabilising the amplitude of its output waveform. The automatic gain control loop is closed through a gate 59 actuated from the phase lock detector 57. The gate 59 is closed, preventing the operation of the automatic gain control, until phase locking occurs. Thus, the slave oscillator automatic gain control loop is inoperative during tuning of the oscillator, and only comes into operation after the correct operating frequency has been set up. Under these conditions the automatic gain control loop can have a higher gain and a longer time constant, thus permitting a more consistent amplitude control and lower harmonic content of the output.

The locking-in sequence occurring when the slave oscillator 4 is to be set to a given frequency is as follows. The frequency-responsive coarse control loop first tunes the slave oscillator to approximately the required frequency while the phase-sensitive fine control and the slave oscillator automatic gain control loops are suppressed. The frequency sensitivity of the coarse control loop depends largely on the arrangements adopted for varying the slave oscillator frequency under its control. With the arrangement shown in FIGURE 2, in which the coarse control loop is arranged to switch inductors or capacitors to pull the slave oscillator towards the required frequency, setting to perhaps 1% of the desired frequency may be achieved by this means.

After frequency locking has been achieved, the phase control loop takes over control of the slave oscillator 4, its filter 54 being by-passed so as not to interfere with its operation. The frequency control loop and the slave oscillator automatic gain control loop are inoperative. Finally phase locking occurs, the low-pass filter 54 is introduced into the phase control loop and the slave oscillator automatic gain control loop is closed. The oscillation generator is now set up for delivering the required output frequency.

The function of the variable frequency divider 6 will now be considered at greater length, since the operation of the frequency generator is very largely limited by the maximum speed at which this counter can reliably perform its function. The divider 6 is a variable-ratio scaler or counter circuit, counting input pulses corresponding to cycles of the slave oscillator frequency and delivering an output pulse each time the count reaches a preset value. It must therefore be capable of counting at speeds up to the maximum operating frequency of the slave oscillator, of giving substantially instantaneous recognition when the preset total is reached and of resetting to begin a new counting cycle before the arrival of the next consecutive input pulse. Counter arrangements for achieving these functions will now be described.

Figure 4:
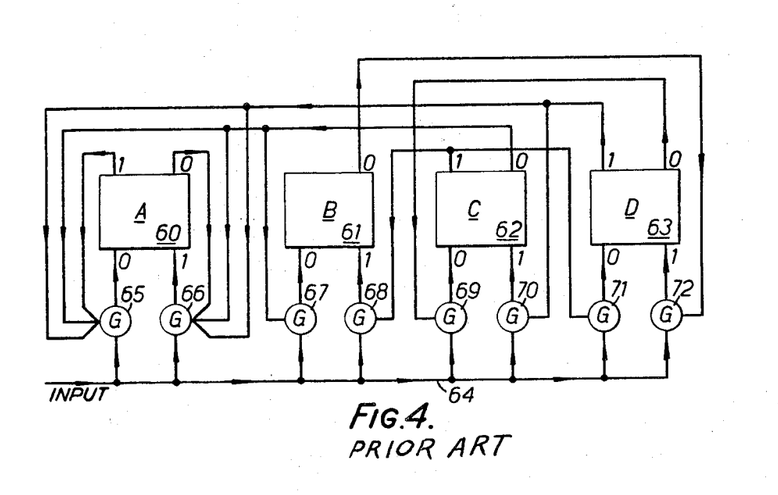
FIGURE 4 shows schematically a decade counter arrangement.
Figure 5:
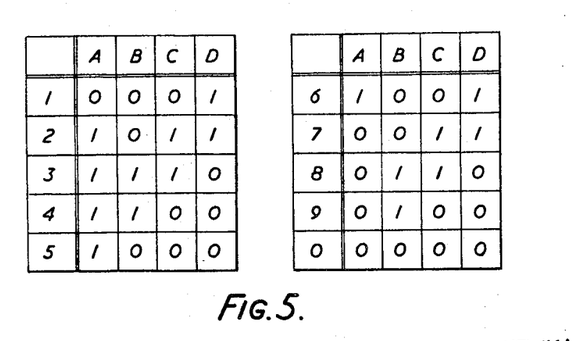
FIGURE 5 shows the counter sequence for the arrangement of FIGURE 4.

FIGURE 4 shows the basic arrangement of a single decade counter including four bistable devices or counting stages 60, 61, 62, 63, which are fed with an input pulse train from a common input line 64 through "AND" gates 65 to 72. The setting of these gates 65 to 72 determine to which of the four bistable devices 60 to 63 a given input pulse is applied, and also determines whether the pulse is applied to the "set 0" or "set 1" input of each bistable device. The gates are themselves controlled by the states of the bistable devices, each gate being connected to an output or a combination of outputs of the bistable devices. These combinations are so arranged that a train of ten consecutive input pulses applied to the input line 64 will cause the counter to cycle through the ten successive states, representing the digits 0 to 9, shown in FIGURE 5.

Figure 6:
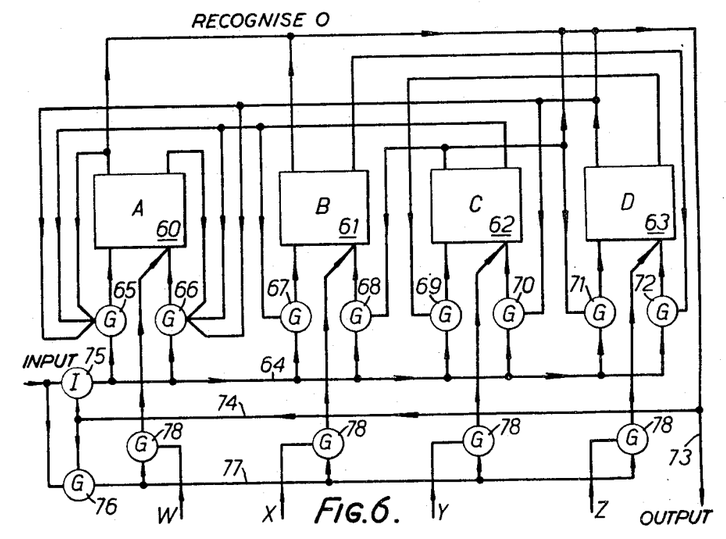
FIGURE 6 shows a modified form of decade counter suitable for use in the generator shown in FIGURES 1–3.

The decade counter shown in FIGURE 6 is arranged to operate as a frequency divider, producing an output pulse train whose repetition frequency is the frequency of the input pulse train divided by any factor between 1 and 10. The decade may of course form a unit of a multi-decade divider. To perform this function the counter is arranged to recognise the occurrence of state "0" (0000 in the counter code) and thereupon to deliver both a significant output on output line 73 and a gating pulse on line 74. The gating pulse, which appears immediately in the state to be recognised is set up on the bistable devices 60 to 63, closes an "inhibit" gate 75 and opens a further gate 76, thus diverting the next input pulse to arrive to a line 77 from which gates 78 connect with the inputs to the bistable devices. The operation of the gates 78 is controlled by four external inputs W, X, Y and Z, whose state is determined by external switching in accordance with the number it is desired to reset in the stage.

Thus immediately the "recognition" state is achieved, the next input pulse to arrive is blocked from the normal counter input and re-routed to act as a resetting pulse through gates 78: on resetting the recognition state vanishes, gates 75 and 76 revert to normal and counting continues with the next input pulse.

Figure 7:
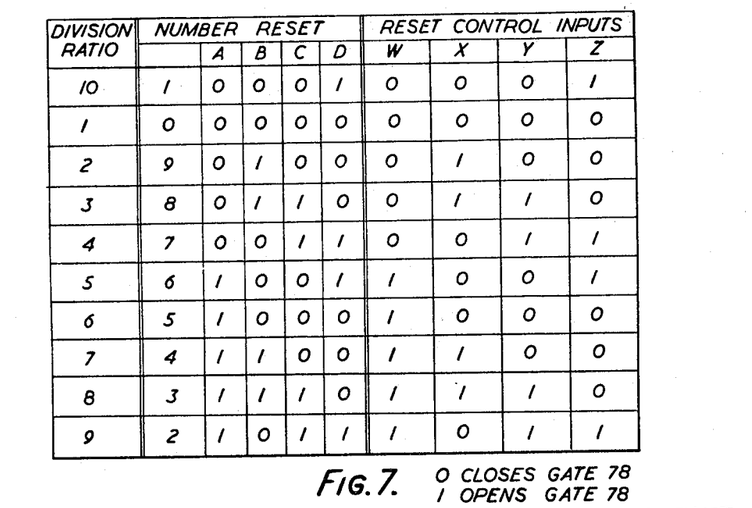
FIGURE 7 is a resetting code chart for FIGURE 6.

FIGURE 7 of the drawings shows the division code, that is to say the relationship between the division ratio to be established by the stage, the number reset in the stage, and the control inputs necessary to achieve this.

It will be seen that resetting of the stage is achieved by a pulse of the input train, the insertion of a "reset" pulse between two consecutive input pulses being avoided. It will also be noted that the state to be recognized by the counter, i.e. state "O," is achieved immediately the last pulse of the train acts upon the appropriate bistable device 10 to 13; there are no inter-stage connections within the decade to result in cumulative delay effects. The resetting operation is performed simultaneously on each bistable device, and there are no inter-device carry pulses to complicate the resetting process.

Figure 8:
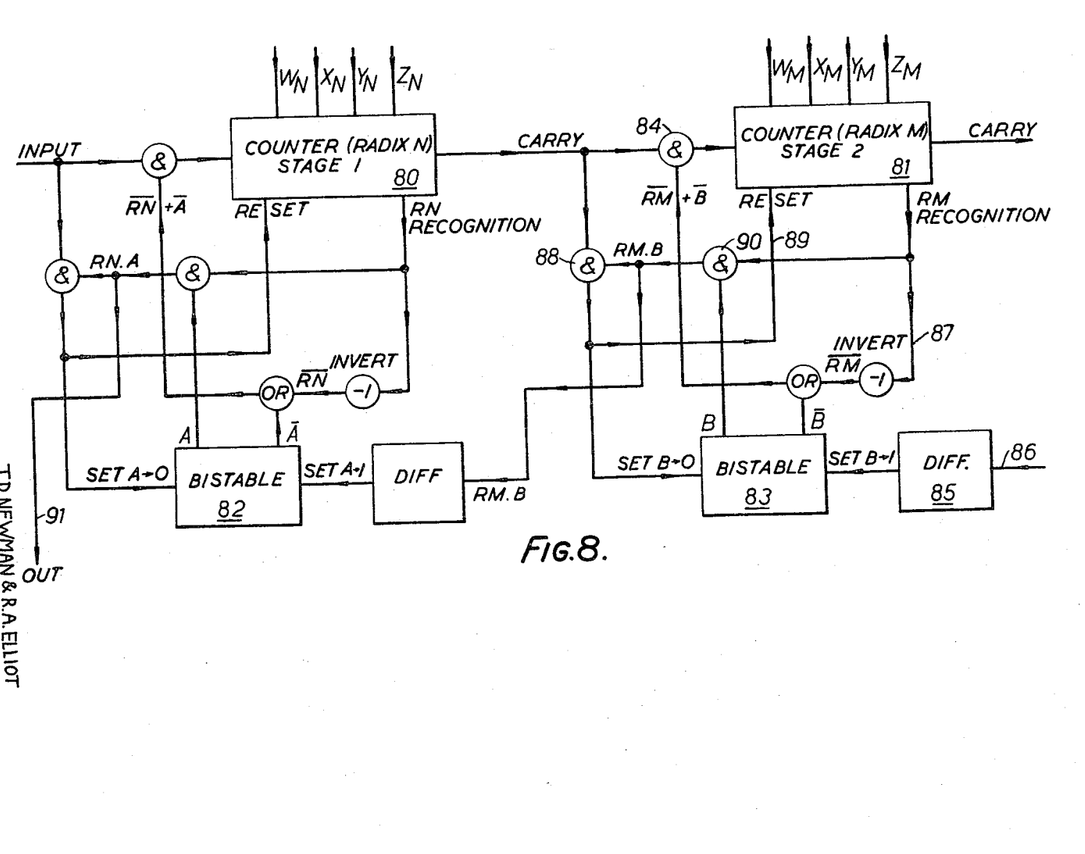
FIGURE 8 shows a block diagram of a multi-stage counter employing the decade counter of FIGURE 6, FIGURE 9, is a more detailed diagram of a single decade of the counter.

FIGURE 8 of the drawings shows the first two decades of a counter having three or more decade stages. Each decade is generally similar to that shown in FIGURE 6 but the presence of the adjacent stages necessitates slight detailed modifications in the means adopted for the routing and control of the input pulses for resetting purposes. (The two counter stages 80 and 81 are assumed to be decade stages for simplicity but in general may have any radix M and N respectively). Each stage includes an additional bistable 82 and 83 respectively which is triggered by the recognition state of the next following stage of the counter. This bistable performs three functions; (a) it allows the faster stage to attain its recognition state; (b) it isolates the slower stage which can then be reset without waiting for the ultimate recognition state; and (c) it destroys the recognition state in the first pulse after recognition, even if the condition of first counter stage does not change. Function (c) allows the counter as a whole to divide by factors such as 11, 21, 31, although a single decade could not in itself divide by 1.

Consider the operation of the second stage 81. Its bistable 83 is set to $B=0$ and therefore the input control gate 84 (corresponding to gate 75 of FIGURE 6) allows carry pulses from stage 80 to pass to the input of stage 81. Carry pulses from stage 81 pass to a subsequent stage, not shown. When this subsequent stage reaches its recognition state the short pulse resulting from the differentiation at 85 of the pulse on its recognition line 86 is used to switch the bistable 83. Counter stage 81 continues to count its input pulses until it reaches its recognition state $R=M-1$. The signal on its recognition line 87 closes the input control gate 84, opens the reset gate 88 and triggers the bistable 82 of the first stage. The next carry pulse from the first stage is blocked from the counter input and passes through the reset gate 88 to the stage reset line 89, resetting the stage to the state determined by the reset control inputs $W_m$, $X_m$, $Y_m$, $Z_m$. The same pulse resets bistable 83 to $B=0$, breaking the recognition state by opening gate 90 and re-opening gate 84 to allow counting to recommence. The first stage 80 now proceeds in the same way to its own recognition state, which when reached fulfills the multiple recognition condition for the counter as a whole and provides an output pulse on line 91.

The counter as a whole may include any number of stages, all except the last stage being identical with those shown in FIGURE 8. The recognition pulse of the last stage is applied without gating to the bistable (such as 83) of the preceding stage and may also be employed to reset the last stage.

Between the two stages 80 and 81 of radix N and M respectively shown in FIGURE 8 a carry pulse will be transmitted for the state N of the first stage. Since $(N-1)$ is the recognition state there will always be at least N pulses between each pair of successive carry pulses, even when resetting occurs. Thus the counting speed of the second stage can safely be smaller than that of the preceding stage by a factor N.

Figure 9:
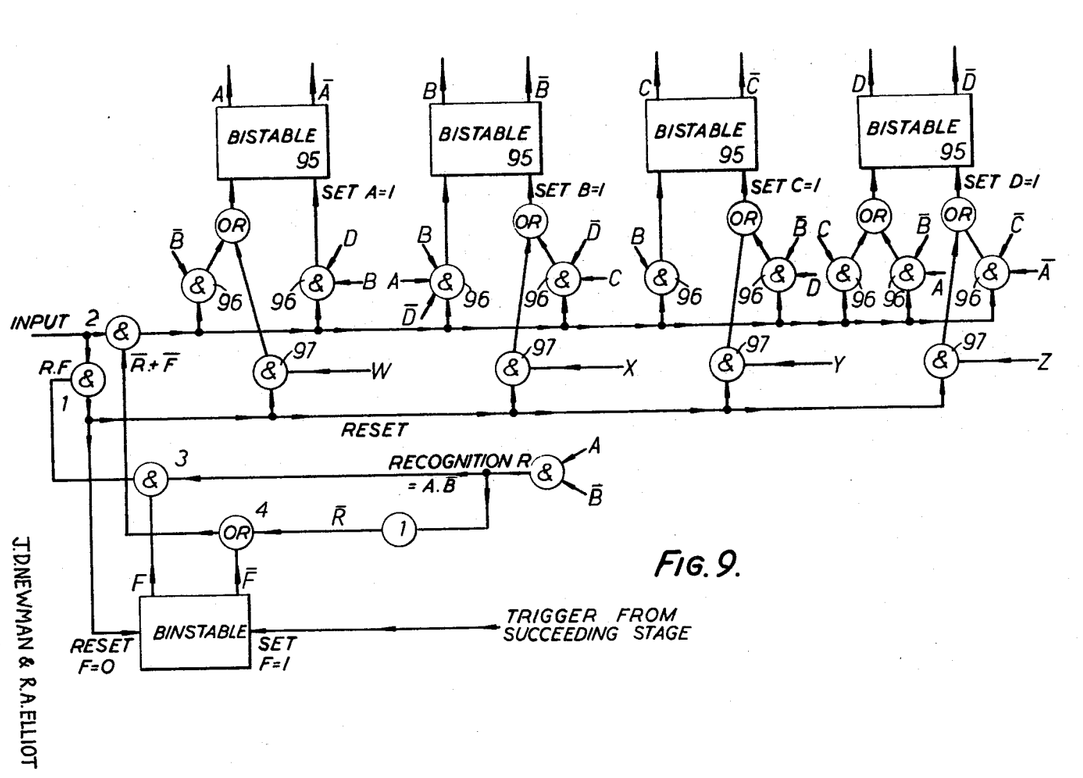

FIGURE 9 shows a diagram of single decade stage corresponding to one of the two stages 80 and 81 shown in FIGURE 8. The counter itself consists of four bistables 95 arranged for parallel-fed counting as described with reference to FIGURES 4, 5 and 6, although the code employed is not the same. Gates 96 are sequencing gates corresponding to gates 65–72 in FIGURES 4 and 6; gates 97 receive the reset control inputs W, X, Y, Z; bistable 98 and its associated gates perform the function of the bistables 82 and 83 (FIGURE 8) and gates 84, 88, 90, etc. The figure employs conventional logical rotation and is self-explanatory; its operation will not be described in the text.

Figure 10:
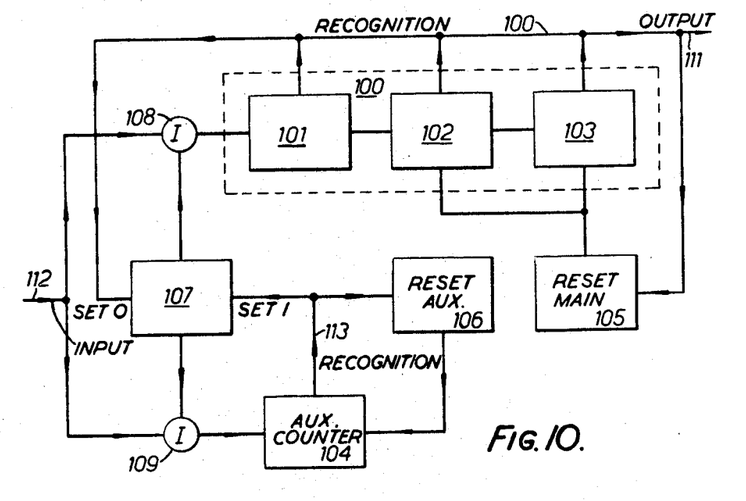
FIGURES 10 and 11 show two alternative counter arrangements.

FIGURE 10 of the drawings shows an alternative form of counter/divider, in which an alternative solution to the problem of rapid resetting of the counter is proposed. The main counter 100 shown in this figure consists of three decade counters 101, 102 and 103, each of which may be a parallel-fed decade of the kind shown in FIGURE 4.

The main counter 100 has associated with it an auxiliary counter 104, which is a simple counter counting from 0 to 9. Recognition pulses from the main and auxiliary counters are used to trigger main and auxiliary pulse generators 105 and 106 respectively and also to change over a bistable trigger device 107 the output of which controls "AND" gates 108 and 109.

The divider functions in the same manner as that previously described by recognition of a first given figure and subsequent resetting to a second given figure, the difference between the two figures giving the division ratio. From the point of view of describing the resetting arrangements of FIGURE 10 it is immaterial whether or not either of these two figures is zero. The sequence of operations for the arrangement of FIGURE 10 is as follows.

Assume that gate 108 is open so that counting is proceeding in the three decades of the main counter 100. When the counter reaches the predetermined recognition number set into it, it delivers an output on its recognition line 110. This output has a three-fold effect. It delivers a significant output to an output line 111, it sets the bistable device 107 to its "0" state, and it triggers the main reset pulse generator 105. The reset pulse generator applies the resetting pulse to decades 102 and 103 of the main counter, but not to the high-speed decade 101, for reasons that will presently appear. The switching of the bistable device 107 closes gate 108 and opens gate 109, thus preventing the next consecutive input pulse arriving at the input 112 from reaching the main counter 100 and applying it to the auxiliary counter 104. Counting then proceeds in the auxiliary counter 104 until recognition occurs of some preset figure. The recognition output on line 113 resets the bistable device 107 to state "1" transferring the input pulse train back to the main counter 100, and triggers the auxiliary reset pulse generator 106 to reset the auxiliary counter 104. The counting sequence then recommences with counting in the main counter 100.

It will be seen that with this arrangement the auxiliary counter 104 is employed to add any number between 0 and 9 to the number preset on the main counter 100, of which the least significant digit will always be zero. The division ratio is thus the sum of the two figures set in the main and auxiliary counters.

Resetting of either counter section is carried out while counting is proceeding in the other section and is therefore not limited in time to the period between consecutive input pulses.

In this arrangement the high-speed decade 101 of the main counter 100 does not need to be reset upon each total recognition by the main counter, since it merely remains at 0. This simplifies the design of the counter. Although this is to some extent offset by the provision of the auxiliary counter 104, this counter need only be a simple device and does not over-complicate the system: it has to count through a single decade (0–9) but it need not be a true decade stage, since it does not have to generate a carry pulse for a subsequent decade.

Figure 11:
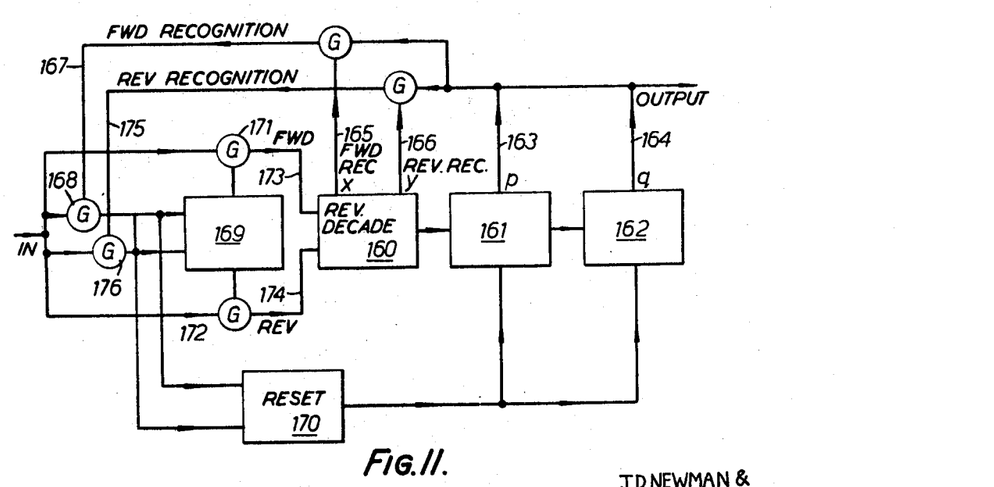

FIGURE 11 of the drawings shows schematically a third form of divider. The counter proper consists of three counting decades 160, 161 and 162; decades 161 and 162 are conventional, but the high-speed decade 160 is reversible. Count recognition is effected by the usual preselected outputs 163 and 164 for the two lower speed decades and by two alternative recognition outputs 165 and 166 for the high-speed decade. The operation of the circuit is as follows.

Assume that the counter is counting normally until the preset recognition number occurs. A "forward" recognition pulse is delivered on line 167 to open gate 168. The next consecutive input pulse in the train passes through gate 168 to switch a bistable device 169, and simultaneously to trigger a reset pulse generator 170 to reset the low-speed decades 161 and 162. The switching of the bistable device 169 closes a gate 171 and opens a second gate 172, diverting the next input pulse from the "forward" input 173 to the decade 160 to the "reverse" input 174. Owing to time delays in the operation of gate 171 the switching pulse will also step the reversible decade 160 by one pulse in the forward direction. The reversible decade 160 now counts the input pulses in reverse, while the low-speed decades 161 and 162 continue to count normally in the forward direction.

The next multiple recognition state occurs when the low-speed decades reach their unique recognition states and the high-speed decade 160 reaches its "reverse" recognition state $y$ on output 166. A recognition pulse is delivered on the "reverse" recognition line 175, opening gate 176 and preparing for the next input pulse to re-switch the bistable device 169. The next input pulse thus switches the input back to the "forward" input 173 of the high-speed decade 160, at the same time stepping the high-speed decade one pulse in the backward direction. Counting now begins in the forward direction until the forward recognition state with which the sequence began is again reached.

The recognition states for the low-speed decades 161 and 162 are set up in accordance with the required division ratio. The two recognition states $x$ and $y$ for the high-speed decade 160 are determined by the relation $x-y=r-2$, there $r$ is the least significant digit of the division ratio required.

What we claim is:

1. A digital counter stage including at least two switching devices having at least two stable positions and having inputs arranged to receive input pulses from a common input line through gating means which determine the effect of an input pulse on the respective switching devices and which are arranged to be set each in correspondence with the state of at least one of the switching devices in such a way that a succession of input pulses causes the counter to progress through a repeated series of counting states, the counter including also recognition means for recognising when the counter has arrived at a selected one of its possible states and further gating means for responding to this recognition and to variable signals applied to said gating means in dependence upon any selected counting state to which the counter is to be reset in such a way that the next consecutive input pulse is employed as a resetting pulse for resetting the counter to recommence counting from said selected reset state.

2. A digital counter including a plurality of bistable devices each having at least one input at which an applied pulse is effective to change the device from one state to another, a common input line for pulses to be counted, and a plurality of gating devices each connected between a said input of a bistable device and the common input line, each gating device having a further connection with at least one bistable device and receiving therefrom a signal dependent upon the condition of the bistable device to determine the response of the gating device to an input pulse, the association of the bistable devices and gating devices being such that a succession of input pulses causes the counter to progress through a repeated series of counting states, the counter including also a further plurality of gating devices each connected between a said input of a bistable device and a common reset line, recognition means responsive to the counter's reaching a selected one of its possible states for delivering an output pulse and effective upon such recognition to direct the next successive input pulses from the common input line to the reset line and means for selectively controlling in dependence upon any selected counting state to which the counter is to be reset the response of the further gating devices to a pulse appearing in the reset line whereby such a pulse sets the counter to said any selected one of its possible states.

3. A digital counter as claimed in claim 1, comprising a plurality of stages arranged so that a stage generates an output pulse as it passes through a predetermined one of its possible states, the said output pulse being applied as an input pulse to a succeeding stage of the counter.

4. A digital counter as claimed in claim 3, arranged for the repetitive counting of a preset interval, the switching devices of the counter forming two counter sections each provided with recognition means arranged when each section reaches a predetermined count to initiate the resetting of the said section and to transfer the input pulses to the other section of the counter.

5. A counter as claimed in claim 3, including cascaded counter stages interconnected so that during a counting operation a higher order counter stage signifies to the next lower order counter stage that it has reached the requisite count condition.

6. A counter as claimed in claim 5 including means by which the condition of a higher order counter stage is signified to the next lower order counter stage by an output pulse which conditions a bistable circuit connected between the two counter stages.

7. An electrical oscillation generator including a variable-frequency oscillator, a fixed-frequency reference source, a variable-ratio divider including a digital counter as claimed in claim 1, arranged to count the cycles of the output waveform of the variable-frequency oscillator and to deliver an output pulse each time a selected number of cycles is counted, and means for controlling the output frequency of the variable frequency oscillator so as to reduce to zero deviations of the repetition frequency of the pulses appearing at the divider output from that of the fixed-frequency reference source.

References Cited

UNITED STATES PATENTS

| | | | |
|---|---|---|---|
| 2,970,761 | 2/1961 | Beranger | 235—92 |
| 3,064,890 | 11/1962 | Butler | 235—92 |
| 3,185,963 | 5/1965 | Peterson et al. | 340—168 |
| 3,078,417 | 2/1963 | Nick | 328—45 |
| 3,183,367 | 5/1965 | Van Berkel | 307—224 |

JOHN S. HEYMAN, *Primary Examiner.*

J. F. MILLER, *Assistant Examiner.*